E. HANSON.
GLASS DRAWING MACHINE.
APPLICATION FILED AUG. 16, 1911.
1,052,336.
Patented Feb. 4, 1913.
2 SHEETS—SHEET 2.
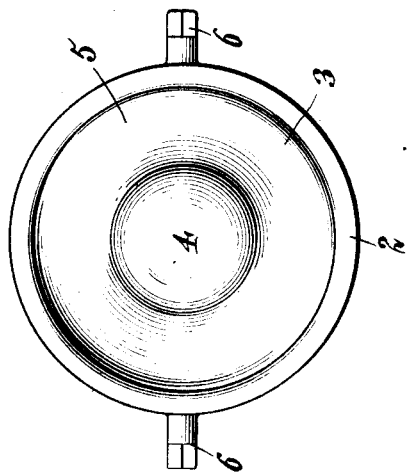
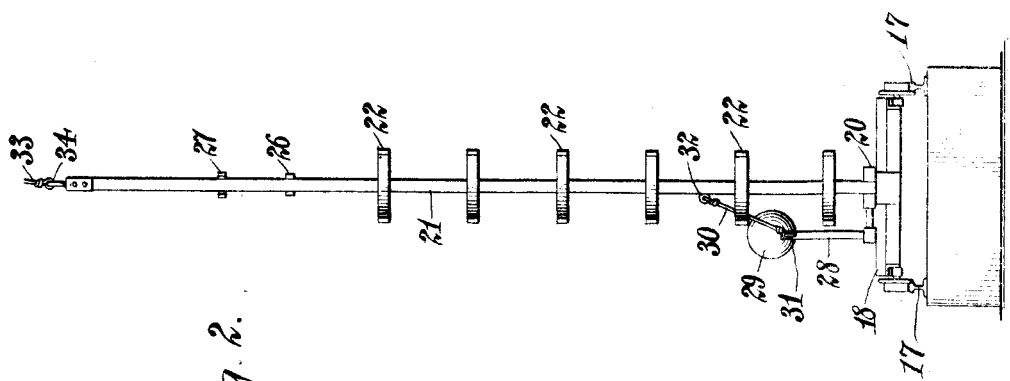
Witnesses
Christ Feinle, Jr.
R. B. Caraday
Inventor,
Edward Hanson.
By Victor J. Evans,
Attorney.

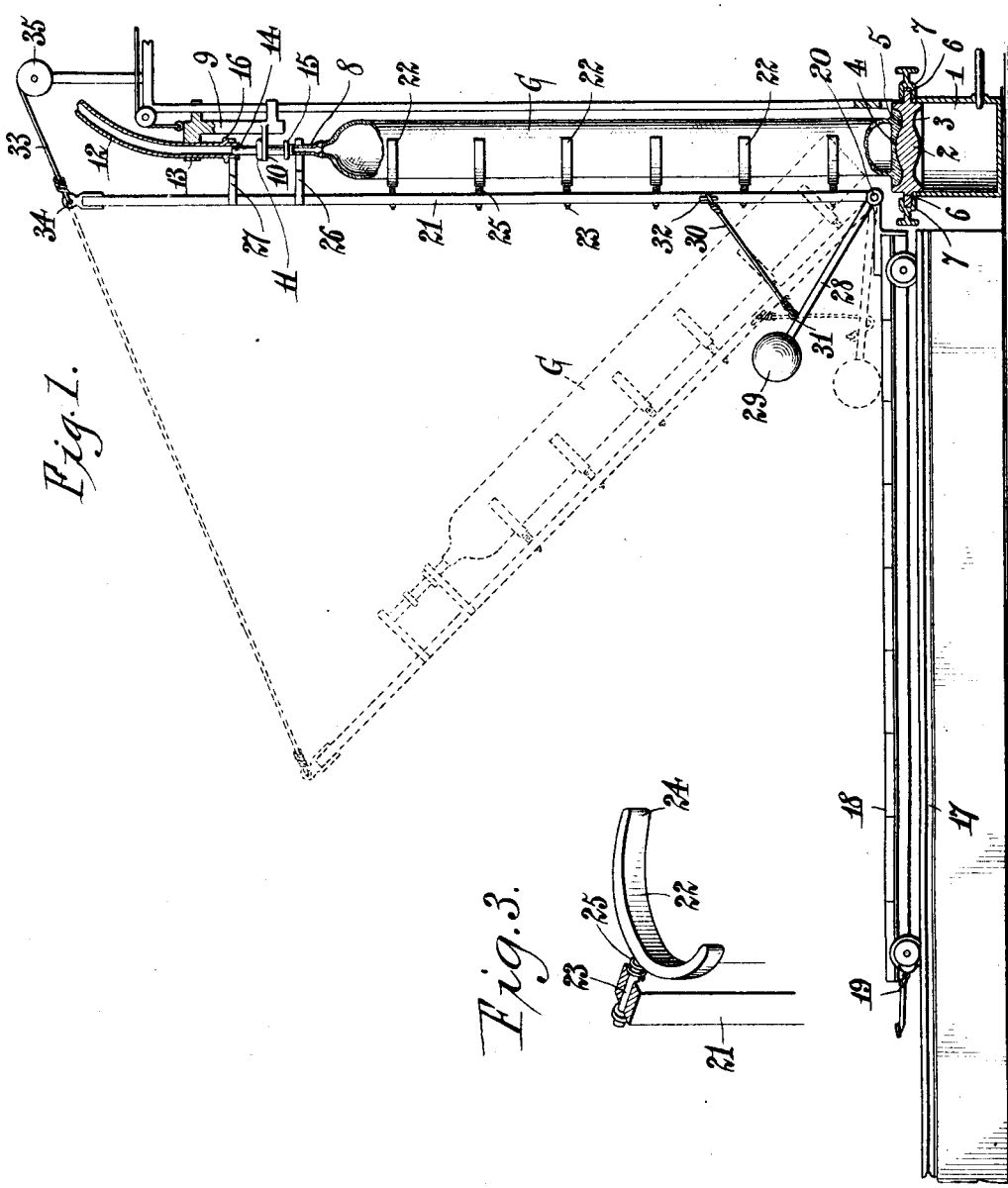

UNITED STATES PATENT OFFICE.

EDWARD HANSON, OF KANE, PENNSYLVANIA.

GLASS-DRAWING MACHINE.

1,052,336.  Specification of Letters Patent.  Patented Feb. 4, 1913.

Application filed August 16, 1911. Serial No. 644,443.

*To all whom it may concern:*

Be it known that I, EDWARD HANSON, a citizen of the United States, residing at Kane, in the county of McKean and State of Pennsylvania, have invented new and useful Improvements in Glass-Drawing Machines, of which the following is a specification.

The present invention relates to certain novel and useful improvements in glass drawing apparatus and has particular application to means for drawing glass tubes or cylinders from which sheets of window glass or the like are subsequently formed.
In carrying out my invention, it is my purpose to provide a glass drawing apparatus embodying in its construction a novel form of pot or receptacle from which the molten glass is drawn by means of the bait device, said pot being reversible so that it may be turned to bring one containing surface or the other into position.

Still another object of my invention is to provide an improved device for removing the glass cylinder after it has been drawn and severed from the body of the molten glass within the pot.

It is also my purpose to provide an improved glass making apparatus which will embody the desired features of simplicity, durability, efficiency and economy.

With the above-recited objects and others of a similar nature in view, the invention consists in the construction, combination and arrangement of parts, set forth in and falling within the scope of the appended claims.

In the accompanying drawings:—Figure 1 is a view in side elevation of a glass making apparatus embodying my invention, the movable cylinder supports being shown in position ready to remove the cylinder from the drawing apparatus, while the melting pot and bait connections are shown in section. Fig. 2 is a view in front elevation of the traveling carriage for removing the glass cylinder. Fig. 3 is a detail perspective view of one of the supports on the swinging beam of the carriage. Fig. 4 is a top plan view of the melting pot.
Referring now to the accompanying drawings in detail, the numeral 1 designates a furnace or heater of any suitable construction over which is mounted the receptacle or pot 2 which is adapted to receive the molten glass measured out of the melting tank, (not shown). The pot which is shown in detail in Fig. 4 comprises an approximately circular body portion dished at its top and bottom faces to form receptacles for the glass. The pot is dished or concaved on each side so that it is deeper adjacent to its edge as at 3 than at the center, the bottom of each receiving portion of the pot gradually sloping or tapering from the center 4 toward the edge. By such an arrangement the molten glass, as the bulk of the same within the pot decreases, blows from the center toward the edge of the pot so that the greater portion of the glass may be withdrawn by the drawing operation, the deepest portion 5 adjacent to the edge of the pot being substantially equal in cross diameter to the cylinder being drawn. The pot is provided with oppositely disposed trunnions 6—6 mounted in bearings 7—7, so that said pot may be reversed by hand or power, so that when the bulk of glass has been withdrawn from the pot it may be turned to bring the portion of the pot from which the glass has just been removed into position over the furnace or heater, thereby melting any particles of glass which may be stuck or attached to the sides or bottom.

The letter G indicates a drawn glass cylinder, while the numeral 8 designates the ordinary blow pipe or bait, adapted to be moved vertically with the reciprocating carriage 9, the latter having the arm 10 adapted to engage beneath the flange 11, at the end of the pipe. The numeral 12 designates the air supply pipe, passing through the guide sleeve 13 on the bait carriage, and detachably connected at 14 to the bait or blow pipe. The latter is provided with a flange 15, for the purpose hereinafter described while the end of the air pipe is provided with a similar flange 16.

Arranged to travel on trackways 17 leading to the pot, is a traveling carriage 18 having a brake 19 by which the carriage may be held stationary in any position along the track. Hinged or pivoted as at 20 to one end of the carriage or truck is a swinging beam 21, preferably of sufficient length so that when elevated it will extend from a point adjacent to the melting pot, upward above the drawing or bait apparatus, said beam being provided with a series of arms 22, suitably spaced. Each arm, as shown in detail in Fig. 3, comprises a shank 23 extending through the beam and carrying at its front end a crotch member 24 forming a rest for the glass cylinder, said member being preferably formed of wood, while 25 designates a coiled compression spring interposed between the crotch rest and the shank of the arm.

The numeral 26 indicates a hook arm extending forward from the beam 21 and adapted when the beam is in position for removing the cylinders to engage beneath the flange 15 on the blow pipe when the carriage of the bait apparatus, while 27 indicates a similar hook arm adapted at such time to engage beneath the flange 16 of the detachable air pipe.

The numeral 28 indicates an arm pivotally connected to the lower end of the beam and carrying at its outer free end a weight 29, while 30 indicates a connecting cable or rod joined at one end as at 31 to the arm 28 and at its opposite end 32 to the beam.

From the above description, taken in connection with the accompanying drawings, the construction and manner of employing my improved glass working apparatus will be readily apparent.

In operation, the pot is filled with molten glass and the bait apparatus lowered by means of its carriage in the usual manner until the blow pipe or bait engages with the molten material. The air is then admitted through the air pipe in the usual manner and the carriage moved upward vertically until the cylinder is drawn to the proper length. The truck carrying the swinging beam is then moved along the trackway to a position as close to the melting pot and cylinder as possible, so that the arm 27 extends beneath the flange 16 on the detachable air pipe, while the hook arm 26 extends beneath the flange 15, the cylinder and drawing connections having been elevated sufficiently by the bait carriage to permit of this. The carriage is now lowered slightly so that the flanges striking against their respective hook arms separate the air pipe from the blow pipe, the cylinder being severed from the bottom in the usual manner. The cylinder now rests in the cradle or crotch arms 22 and the beam is lowered by means of the cable 33 assisted by the weighted arm 28. One end of the cable 33 is attached as at 34 to the end of the beam while the cable is wound about the drum 35, which is actuated in any suitable manner, said drum and cable being used to raise and lower the swinging beam. After the last cylinder is properly positioned upon the rests, the beam is lowered upon the truck by means of the cable and the latter is then moved away to the desired point.

It will be noted that I have provided an exceedingly simple, effective and convenient form of glass making apparatus, by means of which the glass composing the cylinder may be drawn from a reversible pot so constructed that the maximum amount of glass may be drawn therefrom and any slight quantity of glass remaining in the pot may be readily melted when the latter is reversed.

Furthermore, it will be seen that I provide a reliable and efficient means for receiving the cylinder at the time it is severed from the mass of glass in the pot for conveying the cylinder away from the bait apparatus without the possibility of injury.

While I have herein shown and described one particular embodiment of my invention, I wish it to be understood that I do not limit myself to all the precise details of construction herein set forth, as modification and variation may be made without departing from the spirit of the invention or exceeding the scope of the appended claims.

I claim:—

1. In a glass working apparatus, the combination of a receptacle adapted to contain the molten glass, a reciprocating carriage, a blow pipe mounted upon the carriage and adapted to draw the glass from the receptacle, an air pipe detachably connected to the blow pipe at the carriage, a flange upon the blow pipe and a flange upon the air pipe, and means for removing the drawn glass, said means comprising a traveling carriage, a post or beam pivoted to swing at one end of the carriage, a series of arms for supporting the drawn glass, an arm adapted to engage with the flange upon the blow pipe and a second arm adapted to engage the flange upon the air pipe to separate the blow pipe from the air pipe, and means for raising and lowering the post, said means comprising a drum and a cable wound upon said drum and connected to the free end of the post, and a weighted arm upon the lower end of said post.

2. In a glass working apparatus, the combination of a receptacle for the molten glass, means for drawing the glass including a blow pipe and an air pipe detachably connected to the blow pipe, means for removing the drawn glass, said last means comprising a traveling carriage, a member pivoted on the carriage and movable relatively thereto, means on said member adapted to receive the drawn glass, means adapted to engage the blow pipe and the air pipe for detaching the same, means for swinging said member about its pivotal connection with the carriage for raising and lowering the same, and a weight connected to said member to assist in the swinging of the member about its pivotal connection with the carriage in the lowering thereof.

In testimony whereof I affix my signature in presence of two witnesses.

EDWARD HANSON.

Witnesses:
J. S. LUNDGREN,
O. WENSTROM.

Copies of this patent may be obtained for five cents each, by addressing the "Commissioner of Patents, Washington, D. C."